(12) United States Patent
Fang

(10) Patent No.: US 9,527,975 B2
(45) Date of Patent: Dec. 27, 2016

(54) PVC COMPOSITE MATERIAL, FOAM BOARD, PRODUCTION METHOD AND APPARATUS THEREOF, AND FLOORING

(71) Applicant: Zhejiang Tianzhen Bamboo & Wood Development Co., Ltd., Anji County, Zhejiang Province (CN)

(72) Inventor: Qinghua Fang, Zhejiang Province (CN)

(73) Assignee: ZHEJIANG TIANZHEN BAMBOO & WOOD DEVELOPMENT CO., LTD., Anji County, Zhejiang Province (CN)

( * ) Notice: Subject to any disclaimer, the term of this patent is extended or adjusted under 35 U.S.C. 154(b) by 37 days.

(21) Appl. No.: 14/305,807

(22) Filed: Jun. 16, 2014

(65) Prior Publication Data

US 2015/0267025 A1    Sep. 24, 2015

(30) Foreign Application Priority Data

Mar. 21, 2014  (CN) .......................... 2014 1 0106959

(51) Int. Cl.
*C08J 9/12* (2006.01)
*B32B 27/30* (2006.01)
(Continued)

(52) U.S. Cl.
CPC .................. *C08J 9/127* (2013.01); *B32B 3/06* (2013.01); *B32B 3/26* (2013.01); *B32B 27/065* (2013.01);
(Continued)

(58) Field of Classification Search
CPC ........ B32B 27/065; C08J 9/103; C08J 9/0066; C08J 9/0095; C08J 9/36; Y10T 428/249988; Y10T 428/249986
See application file for complete search history.

(56) References Cited

U.S. PATENT DOCUMENTS 4,544,694 A * 10/1985 Bower ..................... C08K 5/09
                                                                106/268
4,599,264 A *  7/1986 Kauffman et al. ............ 442/375
(Continued)

FOREIGN PATENT DOCUMENTS

CN          101407613 A      4/2009
CN          102321318 A      1/2012
(Continued)

OTHER PUBLICATIONS

Australian Patent Examination Report No. 1 dated Mar. 10 2016, as issued in corresponding Australian Patent Application No. 2015234011 (3 pages).
(Continued)

*Primary Examiner* — Hai Vo
(74) *Attorney, Agent, or Firm* — Muncy, Geissler, Olds & Lowe, P.C.

(57) ABSTRACT

The present invention provides a polyvinyl chloride polymer (PVC) composite material including 40-60 parts by weight of PVC, 40-60 parts by weight of light calcium carbonate, 0.8-1.2 parts by weight of composite foaming agent including an inorganic foaming agent and an organic foaming agent, 3-5 parts by weight of foam regulator, 2-4 parts by weight of toughener, 0.8-1.2 parts by weight of lubricant, and 1.5-2.5 parts by weight of stabilizer. The ratio of the inorganic foaming agent to the organic foaming agent by weight in the composite foaming agent is ½-1. Meanwhile, the present invention provides a foam board made of the PVC composite material, an associated production method, an apparatus, and flooring. The resulting PVC products have a high-strength structure and a good foaming property, thus having a satisfied mute effect.

9 Claims, 3 Drawing Sheets

(51) Int. Cl.
  *B32B 27/08*   (2006.01)
  *C08J 9/36*   (2006.01)
  *B32B 3/26*   (2006.01)
  *C08J 9/00*   (2006.01)
  *C08J 9/08*   (2006.01)
  *C08J 9/10*   (2006.01)
  *B32B 27/06*   (2006.01)
  *B32B 3/06*   (2006.01)

(52) U.S. Cl.
  CPC ............. *B32B 27/08* (2013.01); *B32B 27/304* (2013.01); *C08J 9/0014* (2013.01); *C08J 9/0023* (2013.01); *C08J 9/0052* (2013.01); *C08J 9/0061* (2013.01); *C08J 9/0066* (2013.01); *C08J 9/0095* (2013.01); *C08J 9/08* (2013.01); *C08J 9/103* (2013.01); *C08J 9/36* (2013.01); *B32B 2250/02* (2013.01); *B32B 2250/246* (2013.01); *B32B 2266/0235* (2013.01); *B32B 2305/022* (2013.01); *B32B 2307/402* (2013.01); *B32B 2307/554* (2013.01); *B32B 2419/00* (2013.01); *B32B 2471/00* (2013.01); *C08J 2201/03* (2013.01); *C08J 2203/02* (2013.01); *C08J 2203/04* (2013.01); *C08J 2203/18* (2013.01); *C08J 2205/052* (2013.01); *C08J 2327/06* (2013.01); *C08J 2423/06* (2013.01); *C08J 2423/28* (2013.01); *C08J 2433/00* (2013.01); *C08J 2433/08* (2013.01); *C08J 2497/02* (2013.01); *Y10T 428/249988* (2015.04)

(56) References Cited

U.S. PATENT DOCUMENTS

| | | | | |
|---|---|---|---|---|
| 5,283,273 | A | * | 2/1994 | Sander ............... C08K 5/07 524/100 |
| 9,006,301 | B2 | * | 4/2015 | Leeming et al. ............... 521/79 |
| 2006/0292357 | A1 | * | 12/2006 | Cernohous ............... C08J 9/08 428/304.4 |
| 2011/0015307 | A1 | | 1/2011 | Fukushima et al. |
| 2011/0025307 | A1 | * | 2/2011 | Koski et al. ............... 324/207.2 |
| 2014/0343179 | A1 | * | 11/2014 | Raymond et al. ............... 521/92 |

FOREIGN PATENT DOCUMENTS

| | | | |
|---|---|---|---|
| CN | 102492244 | A | 6/2012 |
| CN | 102492244 | A | 6/2012 |
| CN | 102964740 | A | 3/2013 |
| CN | 102964740 | A | 3/2013 |
| CN | 103865208 | A | 6/2014 |
| WO | WO 2010049530 | A2 * | 5/2010 |

OTHER PUBLICATIONS

European Search Report dated Mar. 16 2016, as issued in corresponding European Patent Application No. 15764426.1 (5 pages) and European Examination Report dated May 20, 2016 (7 pages).

* cited by examiner

PVC COMPOSITE MATERIAL, FOAM BOARD, PRODUCTION METHOD AND APPARATUS THEREOF, AND FLOORING

CROSS-REFERENCE TO RELATED APPLICATIONS

This Non-provisional application claims priority under 35 U.S.C. §119(a) on Patent Application No(s). 201410106959.3 filed in Republic of China on Mar. 21, 2014, the entire contents of which are hereby incorporated by reference.

BACKGROUND OF THE INVENTION

Field of the Invention

The present invention relates to a polyvinyl chloride polymer (PVC) board and, more particularly, to a PVC composite material, a foam board, a production method and apparatus thereof, and flooring.

Description of the Related Art

Polyvinyl chloride polymer (PVC) foam boards, known as Xuefu boards and Andi boards, contain polyvinyl chloride polymer as the main chemical composition. During production, a mixture of PVC, a foaming agent and the like is foamed at high temperature, the melt is then extruded by an extruder and conveyed into a mold for shaping and cooling, and the profiles after shaped are cut to obtain the desired boards. The existing formulation of materials forming the PVC foam boards has certain disadvantages. For example: (1) the foaming effect is not so adequate and even, thus to fail to achieve the mute effect due to the use of a single foaming agent; (2) the compositions of the supplementary materials are not so proper, resulting in insufficient strength, hardness and toughness of the boards, thus further shortening the service life of the boards; (3) PVC is likely to be decomposed under light and heat conditions, so the properties of the products are not stable; (4) as the surface of the workpieces is likely to be scratched, the appearance is dissatisfied. Those factors have a great influence on the quality of the boards. Hence, it is necessary to develop a novel PVC composite material to improve the quality of relative products effectively.

BRIEF SUMMARY OF THE INVENTION

In view of the defects of the prior art, an object of the present invention is to provide a PVC (polyvinyl chloride polymer) composite material, a foam board, a production method and apparatus thereof, and flooring, which can effectively improve the quality of PVC board products.

To solve the technique problems as described above, the present invention employs the following technical solution. A PVC composite material is provided, including: 40-60 parts by weight of PVC, 40-60 parts by weight of light calcium carbonate, 0.8-1.2 parts by weight of composite foaming agent comprising an inorganic foaming agent and an organic foaming agent, 3-5 parts by weight of foam regulator, 2-4 parts by weight of toughener, 0.8-1.2 parts by weight of lubricant, and 1.5-2.5 parts by weight of stabilizer. The ratio of the inorganic foaming agent to the organic foaming agent by weight in the composite foaming agent is ½-1.

Preferably, the PVC composite material includes: 45-55 parts by weight of PVC, 45-55 parts by weight of light calcium carbonate, 0.9-1.1 parts by weight of composite foaming agent, 3.5-4.5 parts by weight of foam regulator, 2.5-3.5 parts by weight of toughener, 0.9-1.1 parts by weight of lubricant, and 1.8-2.2 parts by weight of stabilizer.

Optionally, the PVC composite material includes: by parts of weight, 50-60 parts by weight of PVC, 40-50 parts by weight of light calcium carbonate, 1-1.2 parts by weight of composite foaming agent, 4-5 parts by weight of foam regulator, 3-4 parts by weight of toughener, 1-1.2 parts by weight of lubricant, and 2-2.5 parts by weight of stabilizer.

Further, the PVC composite material further includes a brightening agent or 3-5 parts by weight of plant fiber, and an amount of the brightening agent is less than 1.5 parts by weight.

The inorganic foaming agent is sodium bicarbonate, the organic foaming agent is AC (azodicarbonamide), the foam regulator is foam regulator of 530 series, the toughener is CPE (chlorinated polyethylene) or ACR (polyacrylates), the lubricant includes stearic acid and PE (polyethylene) wax, the stabilizer includes calcium stearate and zinc stearate, the brightening agent is titanium oxide, and the plant fiber is wood flour, bamboo powder, straw powder, or a combination thereof.

Meanwhile, the present invention further provides a PVC foam board made by foaming of the PVC composite material as foregoing described.

Accordingly, the present invention further provides a production method of PVC foam boards, including: a step of uniformly mixing and stirring materials forming the PVC composite material as foregoing described; a step of extruding and discharging including heating and foaming the uniformly mixed materials forming the PVC composite material and then extruding viscous foamed PVC extrudate; a step of shaping and cooling including feeding the foamed PVC extrudate into a mold for shaping and cooling in order to obtain PVC foam profiles; and a step of production of finished products including cutting the discharged PVC foam profiles to finally obtain PVC foam boards as finished products.

Meanwhile, the present invention provides a production apparatus of PVC foam boards, including: a mixing and stirring device, configured to uniformly mix and stir the materials forming the PVC composite material as foregoing described; an extruding and discharging device, configured to heat and foam the uniformly mixed materials forming the PVC composite material and then extrude viscous foamed PVC extrudate; a shaping and cooling device, configured to feed the foamed PVC extrudate into a mold for shaping and cooling in order to obtain PVC foam profiles; and a finished product production device, configured to cut the discharged PVC foam profiles to finally obtain PVC foam boards as finished products.

In addition, the present invention further provides flooring, including a PVC layer and a PVC foam layer. The PVC foam layer is made by foaming of the PVC composite material, and the PVC layer is bonded on the surface of the PVC foam layer.

More preferably, the PVC layer includes a hot-pressed PVC wear-resistance layer and a PVC color film layer. The PVC color film layer is bonded to the PVC foam layer, or the PVC color film layer is hot-pressed onto a PVC substrate layer and the PVC substrate layer is bonded to the PVC foam layer.

Compared with the prior art, the present invention optimizes the composition and proportion of the PVC composite material, so that the quality of boards can be improved, as mainly shown in the following aspects: (1) the foaming effect is adequate and even to achieve the mute effect due to the use of appropriate amount of the composite foaming agent and the foam regulator; (2) due to the proper proportion of the light calcium carbonate and the toughener, the strength, hardness and toughness of the boards are advantageously improved; (3) the amount of the stabilizer is optimized, thus preventing the PVC from being decomposed under adverse conditions; (4) due to the addition of the appropriate lubricant, the workpieces are maintained with good fluidity during the process so as to prevent the surface of the workpieces from being scratched, so the appearance of the products is improved advantageously. Through these measures, the present invention can improve the properties of the products effectively and thus hold a larger market share. On this basis, in the present invention, by improving the process and apparatus associated, the quality of relative materials and products is guaranteed to be better.

BRIEF DESCRIPTION OF THE DRAWINGS

It should be appreciated by an ordinary person skilled in the art that a variety of other advantages and benefits will become apparent by reading the following detailed description of the preferred embodiments as below. The drawings are just provided for illustration of the preferred embodiments and should not be regarded as any limitation to the present invention. Throughout the drawings, the same reference numerals denote the same components. In the drawings.

DETAILED DESCRIPTION OF THE INVENTION

Figure 1:
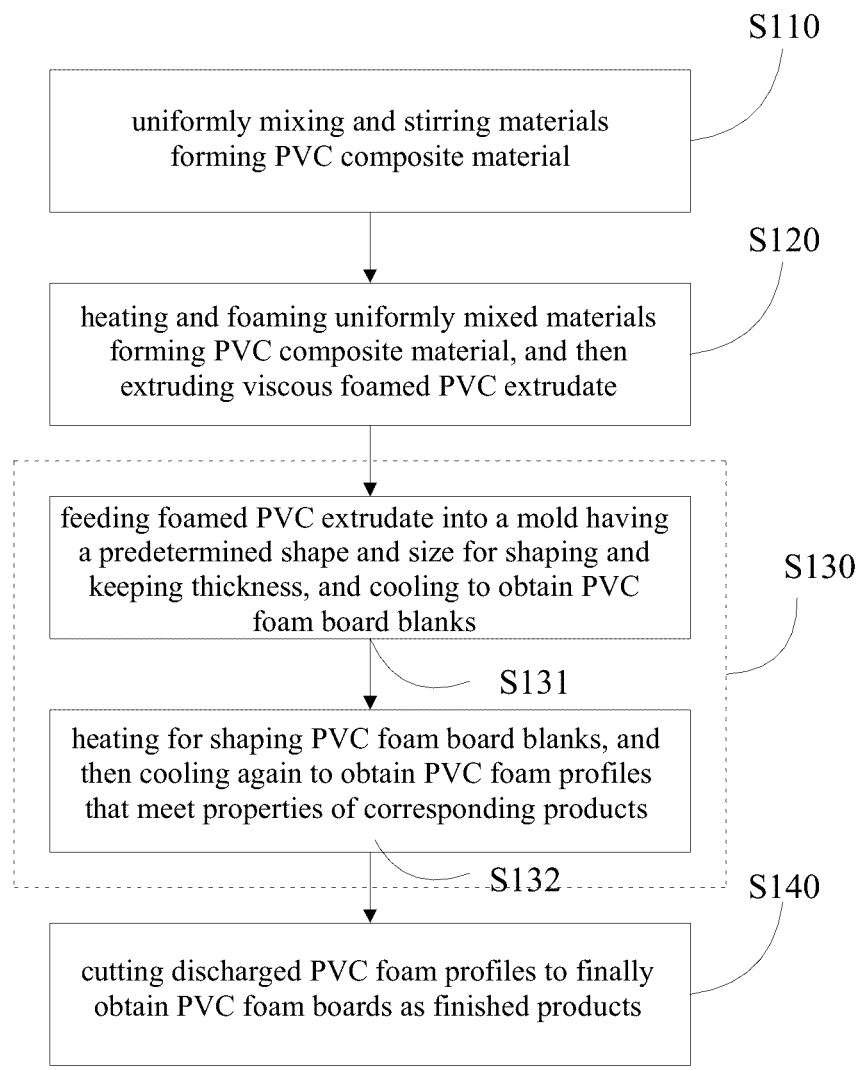
FIG. 1 is a flowchart of a production method of PVC (polyvinyl chloride polymer) foam boards according to one embodiment of the present invention.

Further details are described as below for full understanding of the present invention. However, the present invention may be implemented in other ways different from those described herein. It may be appreciated for an ordinary person skilled in the art that similar popularization may be made without departing from the idea of the present invention. The present invention is thus not limited by the specific embodiments disclosed as below.

A PVC (polyvinyl chloride polymer) composite material according to embodiments of the present invention includes: 40-60 parts by weight of PVC, 40-60 parts by weight of light calcium carbonate, 0.8-1.2 parts by weight of composite foaming agent including an inorganic foaming agent and an organic foaming agent (the ratio of the inorganic foaming agent to the organic foaming agent by weight is ½-1), 3-5 parts by weight of foam regulator, 2-4 parts by weight of toughener, 0.8-1.2 parts by weight of lubricant, and 1.5-2.5 parts by weight of stabilizer. In addition, a small amount of brightening agent (generally, less than 1.5 parts by weight) and plant fiber (generally, 3-5 parts by weight) may be added if required. The features and functions of those compositions are described as follows.

As the main thermoplastic resin, PVC is a kind of white powder of amorphous structure (or, particles with Φ8 mm or less than). Without a definite melting point, PVC starts to soften at 80-85° C., becomes highly elastic at 130° C., and starts to become viscous at 160-180° C. Therefore, PVC may be easily plasticization molded by heating.

As a common chemical raw material, the light calcium carbonate is prepared chemically. The sedimentation volume of the light calcium carbonate, i.e., 2.4-2.8 ml/g, is far larger than that (1.1-1.9 ml/g) of heavy calcium carbonate prepared mechanically. In the PVC composite material according to embodiments of the present invention, the light calcium carbonate serves as fillers, and the hardness and stability of the material may be thus improved effectively.

The function of the composite foaming agent is to facilitate the formation of bubbles during the heating of the raw materials, thus to form a porous finished product, to finally reduce sound/noise. The composite foaming agent in this embodiment may be selected from some existing products in the market, or formed of an inorganic foaming agent and an organic foaming agent. In a specific composite foaming agent, the ratio of the inorganic foaming agent (for example, calcium bicarbonate, magnesium bicarbonate, sodium bicarbonate or the like) to the organic foaming agent (for example, azoic compounds, sulfonyl hydrazine compounds, nitro compounds or the like) is about ½-1. In the more specific case, the composite foaming agent includes 0.6±0.1 parts by weight of the organic foaming agent AC (azodicarbonamide) as an activator and 0.8±0.1 parts by weight of the sodium bicarbonate as the endothermic inorganic foaming agent. In this case, on one hand, the burst decomposition of AC is improved, and on the other hand, it is easier to prepare a desired foaming agent. The use of such an improved composite foaming agent helps to increase the efficiency of foaming and to ensure that the foam is more delicate and uniform.

The foam regulator, as an acrylate processing aid, is resilient resin. The main function of the foam regulator in the materials of the present invention is to facilitate the plasticization of PVC, to enhance the strength of PVC melt and avoid foams from merging or breaking, and to ensure the melt to have good fluidity and improve the surface glossiness of the product. In embodiments of the present invention, the foam regulator may be foam regulator of 530 series (ZD530, LS530, BZ530, PA530, etc., specifically referring to the product introductions of JINHASS and other companies). The foam regulator is able to increase the pressure and torque of the PVC melt, to thus effectively increase the cohesion and homogeneity of the PVC melt and to make the resulting PVC products more compact.

The toughener is a substance used for enhancing the toughness of the composite material layer. As a plasticization processing aid, the main function of the toughener is to enhance the toughness and shock resistance of the product. In this embodiment, the toughener may be CPE (chlorinated polyethylene) or otherwise ACR (polyacrylates).

The main function of the lubricant, as internal lubricant, is to lubricate the contact surface of the composite material to further make it have better fluidity, in order to avoid scratching the workpieces. The lubricant may be formed of stearic acid and PE (polyethylene) wax, where the two components may be prepared in a proportion of approximately equal amount (0.8-1:0.8-1). The lubricant may also accelerate the melting of PVC, improve the strength and homogeneity of the melt, reduce the fracture and exudation of the melt, and have no obvious adverse effects on the mechanical property of PVC.

The stabilizer is mainly used for slowing down the reaction of the substance, maintaining the chemical equilibrium, reducing surface tension, and preventing photolysis and thermolysis, oxygenolysis or the like. In the present invention, the main function of the stabilizer is to inhabit the decomposition of PVC, thus to ensure the quality of the product. In the embodiments of the present invention, the stabilizer may be a metal soap stabilizer. Specifically, the stabilizer may be prepared from calcium stearate and zinc stearate in a proportion of approximately equal amount (0.8-1:0.8-1).

The brightening agent, also referred to as optical brightening agent or fluorescent brightening agent, is an optional raw material. The main function of the brightening agent is to make the product have the better appearance. In this embodiment, the brightening agent may be titanium oxide, the main component of which is $TiO_2$ and which may improve the properties of the product and may reduce the use cost of materials in comparison with other brightening agents.

Other auxiliary agents, i.e., 3-5 parts of plant fiber supplementary materials such as straw powder, wood flour, bamboo flour, or a mixture thereof, may be added. On the one hand, the auxiliary agents may enhance the foaming effect and improve the density, resilience and toughness of the product, and on the other hand, the auxiliary agents contribute to the reduction of the comprehensive cost of materials.

The above embodiments optimize the composition and proportion of the PVC composite material, mainly as shown in the following aspects: (1) the foaming effect is adequate and even to achieve the mute effect due to the reasonable selection of the composite foaming agent and the foam regulator; (2) the light calcium carbonate and the toughener are in proper proportion, so that it is advantageous to enhance the strength, hardness and toughness of the boards; (3) the amount of the stabilizer is optimized, so the PVC is prevented from being decomposed under adverse conditions, and the stability of the product is maintained; and (4) due to the addition of the appropriate lubricant, the workpiece is allowed to have good fluidity during the technological process, so the surface of the workpiece is prevented from being scratched, and the product has the better appearance. By these measures, the boards obtained from the PVC composite material provided by the present invention may improve the quality of the product effectively and finally contribute to hold a larger market share.

According to the requirements of functional characteristics of the above materials, the PVC composite material provided by the present invention may be combined by different formulations, thus to meet the requirements of different products. Table one shows different formulation combinations of the PCV composite material.

content of PVC is generally greater than that of the light calcium carbonate. The composite forming agent, the foam regulator, the toughener, the lubricant, and the stabilizer are used as supplementary materials, and their total amount is equivalent to 10%-15% of the main materials. The brightening agent is an optional component and is generally used when there are requirements for the color of the materials. The plant fibers are not listed and may be added according to the requirements of the product.

All the above formulation combinations can achieve waterproof and mute effects, and are further described as below by specific embodiments.

Embodiment One

The PVC composite material includes 50 parts by weight of PVC, 50 parts by weight of light calcium carbonate, 1 part by weight of composite foaming agent (0.4 parts by weight of sodium bicarbonate and 0.6 parts by weight of AC), 4 parts by weight of foam regulator ZD530, 3 parts by weight of toughener CPE, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), 1 part by weight of brightening agent, and no any supplementary materials such as plant fiber. The compositions in this embodiment are proportioned at a median value, and comparatively neutral (with respect to other embodiments) high-quality products can be thus obtained.

Embodiment Two

The PVC composite material includes 50 parts by weight of PVC, 50 parts by weight of light calcium carbonate, 1 part by weight of composite foaming agent (0.4 parts by weight of sodium bicarbonate and 0.6 parts by weight of AC), 4 parts by weight of foam regulator ZD530, 3 parts by weight of toughener ACR, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), no any brightening agent, and no supplementary materials such as plant fiber. As no any brightening agent is added in this embodiment, the PVC composite material can be adapted to applications such as flooring cores and substrates.

Embodiment Three

The PVC composite material includes 54 parts by weight of PVC, 46 parts by weight of light calcium carbonate, 1.1

TABLE ONE

Formulation combinations of the PCV composite material of the present invention

| Formulation | PVC | Light calcium carbonate | Composite forming agent | Foam regulator | Toughener | Lubricant | Stabilizer | Brightening agent |
|---|---|---|---|---|---|---|---|---|
| Combination 1 | 40-60 | 40-60 | 0.8-1.2 | 3-5 | 2-4 | 0.8-1.2 | 1.5-2.5 | <1.5 |
| Combination 2 | 40-60 | 40-60 | 0.8-1.2 | 3-5 | 2-4 | 0.8-1.2 | 1.5-2.5 | 0 |
| Combination 3 | 45-55 | 45-55 | 0.9-1.1 | 3.5-4.5 | 2.5-3.5 | 0.9-1.1 | 1.8-2.2 | 0 |
| Combination 4 | 48-52 | 48-52 | 0.95-1.05 | 3.6-4.4 | 2.8-3.2 | 0.95-1.05 | 1.9-2.1 | 0 |
| Combination 5 | 40-60 | 40-60 | 0.8-1.2 | 3-5 | 2-4 | 0.8-1.2 | 1.5-2.5 | 0.8-1.2 |
| Combination 6 | 45-55 | 45-55 | 0.9-1.1 | 3.5-4.5 | 2.5-3.5 | 0.9-1.1 | 1.8-2.2 | 0.9-1.1 |
| Combination 7 | 48-52 | 48-52 | 0.95-1.05 | 3.6-4.4 | 2.8-3.2 | 0.95-1.05 | 1.9-2.1 | 0.95-1.05 |
| Combination 8 | 50-60 | 40-50 | 1-1.2 | 4-5 | 3-4 | 1-1.2 | 2-2.5 | 1-1.2 |
| Combination 9 | 55-60 | 40-45 | 1.1-1.2 | 4.5-5 | 3.5-4 | 1.1-1.2 | 2.2-2.5 | 1.1-1.2 |
| Combination 10 | 56-58 | 42-44 | 1.15-1.2 | 4.6-4.8 | 3.6-3.8 | 1.15-1.2 | 2.35-2.45 | 1.15-1.2 |

The components of the PVC composite material in Table one have the following characteristics. PVC and the light calcium carbonate are used as main materials, and the parts by weight of composite foaming agent (0.4 parts by weight of sodium bicarbonate and 0.7 parts by weight of AC), 4.5 parts by weight of foam regulator ZD530, 3.3 parts by weight of toughener ACR, 1.1 parts by weight of lubricant (0.5 parts by weight of stearic acid and 0.6 parts by weight of PE wax), 2.1 parts by weight of stabilizer (1 part by weight of calcium stearate and 1.1 parts by weight of zinc stearate), no any brightening agent, and no supplementary materials such as plant fiber. As the proportion of PVC is significantly higher than that of the light calcium carbonate, the PVC composite material has excellent toughness and slightly higher strength than that prepared in the above embodiments.

Embodiment Four

The PVC composite material includes 49 parts by weight of PVC, 51 parts by weight of light calcium carbonate, 1 part by weight of composite foaming agent (0.4 parts by weight of sodium bicarbonate and 0.6 parts by weight of AC), 4 parts by weight of foam regulator ZD530, 3.1 parts by weight of toughener ACR, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), no any brightening agent, and no supplementary materials such as plant fiber. As a proper amount of the foam regulator ZD530 is used in this embodiment, the PVC composite material has a satisfied foaming effect and the better muff effect.

Embodiment Five

The PVC composite material includes 58 parts by weight of PVC, 42 parts by weight of light calcium carbonate, 1.2 parts by weight of composite foaming agent (0.5 parts by weight of sodium bicarbonate and 0.7 parts by weight of AC), 4.8 parts by weight of foam regulator ZD530, 3.8 parts by weight of toughener CPE, 1.2 parts by weight of lubricant (0.6 parts by weight of stearic acid and 0.6 parts by weight of PE wax), 2.5 parts by weight of stabilizer (1.2 parts by weight of calcium stearate and 1.3 parts by weight of zinc stearate), 0.9 parts by weight of titanium oxide, and no supplementary materials such as plant fiber. As the proportion of PVC in this embodiment is relatively large, the PVC composition material has superior toughness.

Embodiment Six

The PVC composite material includes 52 parts by weight of PVC, 48 parts by weight of light calcium carbonate, 1 part by weight of composite foaming agent (0.5 parts by weight of sodium bicarbonate and 0.5 parts by weight of AC), 4 parts by weight of foam regulator ZD530, 3 parts by weight of toughener ACR, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), 1.2 parts by weight of titanium oxide, and no supplementary materials such as plant fiber. As a larger amount of brightening agent is added in this embodiment, the PVC composition material has the better appearance.

Embodiment Seven

The PVC composite material includes 51 parts by weight of PVC, 49 parts by weight of light calcium carbonate, 1 part by weight of composite foaming agent (0.4 parts by weight of sodium bicarbonate and 0.6 parts by weight of AC), 4.2 parts by weight of foam regulator ZD530, 3.2 parts by weight of toughener CPE, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), 1 part by weight of titanium oxide, and 4 parts by weight of wood flour. As the wood flour is added in this embodiment, the PVC composition material has increased strength and toughness.

Embodiment Eight

The PVC composite material includes 58 parts by weight of PVC, 42 parts by weight of light calcium carbonate, 1.2 parts by weight of composite foaming agent (0.5 parts by weight of sodium bicarbonate and 0.7 parts by weight of AC), 4 parts by weight of foam regulator ZD530, 3.8 parts by weight of toughener ACR, 1.1 parts by weight of lubricant (0.5 parts by weight of stearic acid and 0.6 parts by weight of PE wax), 2.4 parts by weight of stabilizer (1.2 parts by weight of calcium stearate and 1.2 parts by weight of zinc stearate), 1.1 parts by weight of titanium oxide, and 5 parts by weight of bamboo flour. As the proportion of PVC in this embodiment is relatively large, the PVC composition material added with the bamboo flour has increased toughness and ductility.

Embodiment Nine

The PVC composite material includes 56 parts by weight of PVC, 44 parts by weight of light calcium carbonate, 1.1 parts by weight of composite foaming agent (0.5 parts by weight of sodium bicarbonate and 0.6 parts by weight of AC), 4.6 parts by weight of foam regulator PA530, 3.8 parts by weight of toughener ACR, 1.1 parts by weight of lubricant (0.5 parts by weight of stearic acid and 0.6 parts by weight of PE wax), 2.4 parts by weight of stabilizer (1.2 parts by weight of calcium stearate and 1.2 parts by weight of zinc stearate), 1.1 parts by weight of titanium oxide, and 4 parts by weight of straw powder. As the proportion of PVC in this embodiment is relatively large, the PVC composition material added with the straw powder has improved toughness and ductility.

Embodiment Ten

The PVC composite material includes 57 parts by weight of PVC, 43 parts by weight of light calcium carbonate, 1.1 parts by weight of composite foaming agent (0.5 parts by weight of sodium bicarbonate and 0.6 parts by weight of AC), 4.6 parts by weight of foam regulator LS530, 3.8 parts by weight of toughener ACR, 1.1 parts by weight of lubricant (0.5 parts by weight of stearic acid and 0.6 parts by weight of PE wax), 2.4 parts by weight of stabilizer (1.2 parts by weight of calcium stearate and 1.2 parts by weight of zinc stearate), 1.1 parts by weight of titanium oxide, and 4 parts by weight of a mixture of bamboo flour and wood flour. As the bamboo flour and the wood flour are mixed in PVC in this embodiment, the PVC composition material has reduced cost while guaranteeing the toughness and strength.

The materials of the PVC composite materials provided by the present invention have been described as above. This composite material contributes to the improvement of the quality of the product. On this basis, by improving the process and apparatus associated in the present invention, the resulting boards and finished products have better quality, as further described below.

The PVC foam boards provided by the present invention are made by foaming of the PVC composite material described above. The specific process (sometimes referred to as production method, with the same meaning) of the PVC foam boards is briefly described as below. To better understand the technical principle and working process of the present invention, the present invention is further described as below in details with reference to accompanying drawings and specific embodiments.

Referring to FIG. 1, a flowchart of a production method of PVC foam boards according to one embodiment of the present invention is shown, mainly including the following steps S110-S140 specifically.

Step S110: A step of uniformly mixing and stirring materials forming the PVC composite material (with components as described above). Specifically, two times of mixing, i.e., mixing at a low speed and mixing at a high speed, are provided. The first time of mixing is to stir at a high speed of 1000-1200 r/min, thus to facilitate all raw materials to be mixed uniformly. The second time of mixing is to stir at a low speed of 500-600 r/min, thus to realize cooling while further mixing. The product obtained after the two times of mixing is greatly improved in both density and stability.

Step S120: A step of extruding and discharging including heating and foaming the uniformly mixed materials forming the PVC composite material, and then extruding viscous foamed PVC extrudate. Generally, this step may be performed in an extruder. The heating and foaming temperature is 160° C.-190° C. Whereby, the materials are fused and plasticized to be viscous, and then are extruded smoothly under an external force and finally are fed into a mold continuously for shaping.

Step S130: A step of shaping and cooling including feeding the foamed PVC extrudate into a mold for shaping and cooling in order to obtain PVC foam profiles. In this step, two times of shaping and cooling processes are provided. Specifically a secondary shaping process, i.e., a step of heating for shaping and cooling, is added on the basis of the existing process. As a result, cracks, hunches and other quality defects resulted from the change in the shrinkage ratio of the upstream process are avoided effectively.

In step S130, the two times of shaping and cooling are specifically described as follows.

The first time of shaping and cooling (step S131): feeding the foamed PVC extrudate into a mold having a predetermined shape and size for shaping and keeping thickness, and then cooling to obtain PVC foam board blanks (the cooling temperature is 20° C.-40° C.). The cooled PVC foam board blanks may be stretched to a certain extent, so that the PVC foam board blanks may be fed into a next procedure for secondary shaping under the traction of a traction apparatus, thus to reduce the shrinkage ratio.

The second time of shaping and cooling (step S132) actually includes two processes, i.e., heating for shaping and cooling (they may be separately performed in different devices, or performed in the same device in turn), specifically: heating for shaping the PVC foam board blanks (heating for shaping the blanks at 75° C.-85° C. for 2-3 mins), cooling again to obtain PVC foam profiles that meet the properties of corresponding products (the cooling temperature is 20° C.-40° C.), and dragging the cooled PVC foam profiles into a cutting procedure to obtain the finished products.

The PVC foam profiles obtained after two times of shaping and cooling in step S131 and step S132 have little deformation. The PVC foam profiles have a shrinkage ratio of 0.25%-1.0% when detected at 80° C. for 6 h. Therefore, the quality of the products may be improved greatly.

It is appreciated that each process of the present invention as shown in FIG. 1 may achieve heating or cooling required by the above technological parameters in various ways. A combination way is: the way of heating and foaming PVC materials and the way of heating and shaping PVC foam board blanks are water heating, oil heating, or heating with resistor medium; and the way of cooling PVC foam board blanks and the way of cooling PVC foam profiles are air cooling, water cooling, or natural cooling. Certainly, this technology may also employ other heating and cooling combination ways, and the other heating and cooling combination ways are not repeated here.

It is to be pointed out that, the first time of shaping (cooling for shaping, i.e., the step of feeding into a mold for shaping and cooling) and the second time of shaping (heating for shaping, i.e., the step of heating for shaping and cooling) in the technological process shown in FIG. 1 are performed on respective shaping tables without mutual interference. It is appreciated that there may be no shaping tables used in the technological process, or the shaping tables are used only during feeding into a mold for shaping and heating for shaping but not during the two times of cooling. Specifically, in the technological process, corresponding materials may be continuously conveyed in a way of twice traction, where the first traction is set after a cooling and shaping station while the second traction is set prior to a discharging station, and the speed of the first traction (the traction of the PVC foam board blanks) is slightly less than that of the second traction of the PVC foam profiles (the speed difference between the both is approximately equal to 0.25%-1.0% of the shrinkage ratio). Thus, the long distance and deformation defects of the materials in a deterministic state may be overcome by the two times of traction, further to improve the quality of the product.

During the production process of PVC foam boards in this embodiment, the boards stretched by the first time of traction are performed with secondary shaping. Then deformation of the boards after the first time of traction is reduced by two operations of heating first and then cooling, and then, the boards obtained after the second time of shaping are performed with secondary traction. Thereby the obtained boards have little deformation, and the shrinkage ratio and bend curvature of the boards are also reduced obviously, so that it is advantageous to improve the quality of the product.

Step S140: a step of production of finished products including cutting discharged PVC foam profiles to finally obtain PVC foam boards as finished products.

According to the production method of PVC foam boards shown in FIG. 1, a complete set of production apparatus of PVC foam boards may be contemplated correspondingly, and is described as below in details. It is to be pointed out that, if there are incomplete descriptions for the production apparatus in this embodiment, please refer to the content of the foregoing technology; similarly, if the foregoing technology involves in the related apparatus, refer to the content described below.

Figure 2:
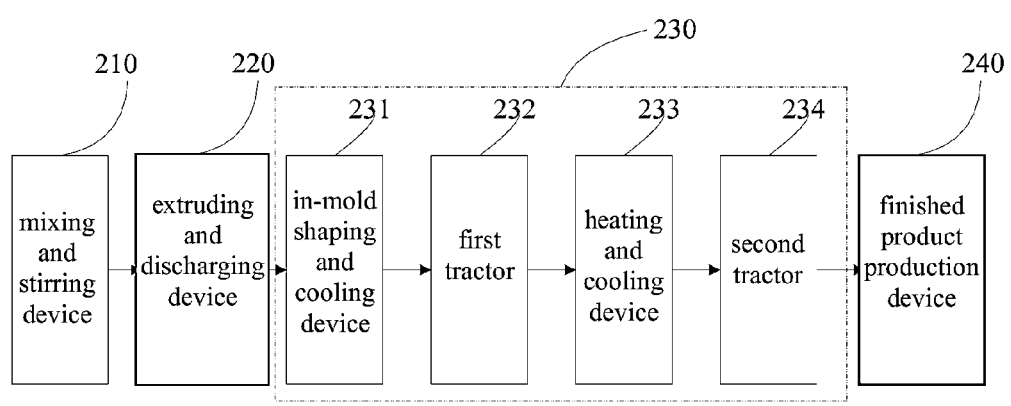
FIG. 2 is a system diagram of a production apparatus of PVC foam boards according to one embodiment of the present invention.

Referring to FIG. 2, a system diagram of a production apparatus of PVC foam boards according to one embodiment of the present invention is shown. In FIG. 2, the arrows represent from workpieces (materials) to a delivery direction. The production apparatus of PVC foam boards in this embodiment includes a mixing and stirring device 210, an extruding and discharging device 220, a shaping and cooling device 230, a finished product production device 240, and etc., which are arranged in a order of delivering the workpieces.

The mixing and stirring device 210 is configured to uniformly mix and stir the materials forming the PVC composite material. Specifically, the forgoing two times of mixing, i.e., mixing at a low speed and mixing at a high speed, may be utilized to improve the density and stability of the product.

The extruding and discharging device 220 may be specifically an extruder, and configured to heat and foam the mixed materials forming the PVC composite material and then extrude viscous foamed PVC extrudate.

The shaping and cooling device 230 is configured to feed the foamed PVC extrudate into a mold for shaping and cooling to obtain PVC foam profiles. As shown in FIG. 2, the shaping and cooling device 230 specifically includes an in-mold shaping and cooling device 231, a first tractor 232, a heating and cooling device 233, and a second tractor 234. The in-mold shaping and cooling device 231 (may be of an integral or a split structure) is configured to feed the foamed PVC extrudate into a mold having a predetermined shape and size for shaping and keeping thickness and then cool to obtain the PVC foam board blanks. The first tractor 232 is configured to stretch the cooled PVC foam board blanks to a certain extent, and then feed them into a next procedure for secondary shaping. The heating and cooling device 233 may also be of an integral or a split structure and configured to heat the PVC foam board blanks for shaping, and then cool to obtain the PVC foam profiles that meet the properties of a corresponding product. The second tractor 234 is configured to drag the cooled PVC foam profiles to a cutting procedure for processing.

The finished product production device 240 may be specifically a known cutting machine for cutting the discharged PVC foam profiles to finally obtain PVC foam boards as finished products.

In this embodiment, there are the first tractor 232 and the second tractor 234. The traction speed of the first tractor 232 is slightly less than that of the second tractor 234. The specific positions of the both are described here. The first tractor 232 is disposed on a station between the in-mold shaping and cooling device 231 and the heating and cooling device 233 to drag the PVC foam board blanks, while the second tractor 234 is disposed on a station between the heating and cooling device 233 and the finished product production device 240 to drag the PVC foam profiles. It is appreciated that the first tractor 232 and the second tractor 234 may also be disposed on other proper stations. Of course, they may also be replaced with other types of conveyors (for example, friction conveyors, etc.), and are not repeated here. In this embodiment, the shrinkage ratio and bend curvature during the production process of the core boards are reduced by two times of shaping, so that the product quality of the PVC foam boards may be improved. It is appreciated that, to better ensure the product yield, the present invention should reasonably adjust technological parameters and apparatus types according to the requirements of the product. The following is a preferred application example.

In the embodiment of the production apparatus of PVC foam boards, the cooling for shaping and the heating for shaping are performed on respective shaping tables (according to the technological requirements, there may also be no shaping tables, or the shaping tables are used just in part). The heating may be heating with water, oil, resistor medium, or in other ways, while the cooling is cooling with cooling water, natural cooling, or other ways. Preferred technological parameters are as follows: (1) extruding and discharging: feeding PVC materials into an extruder, heating, forming and extruding, where the temperature of heating and foaming is controlled at 180° C.; (2) feeding into a mold and shaping: feeding the extrudate into a mold for shaping and keeping thickness; (3) cooling for shaping: performing the first time of cooling and shaping to the de-molded extrudate, where the temperature of cooling and shaping is 30° C.; (4) one time of traction: dragging the cooled and shaped extrudate via the first tractor; (5) heating for shaping: heating the cooled and shaped base material again and shaping for 2-3 mins at 75-85° C.; (6) dragging and discharging: cooling the heated and shaped extrudate to 30° C., and discharging the materials under the traction of the second tractor.

Such apparatus section and technological parameters may reduce the shrinkage ratio and bend curvature during the production process of the core boards, so that it is advantageous to improve the product quality of the PVC foam boards. In the prior art, during the traction and cooling of the materials, the shape (including thickness and height) of the extrudate being hot may be changed, so that it is likely to result in a high rage of the change of the shrinkage ratio during the subsequent procedures. However, in this embodiment, the materials are heated and cooled again for shaping after cooled for shaping, so that the core boards formed by the secondary shaping can effectively avoid cracks, hunches and other problems resulted from the change in the shrinkage ratio.

The above PVC foam boards may be applied to floorings. The following describes an example of floorings with waterproof and mute effects.

Figure 3:
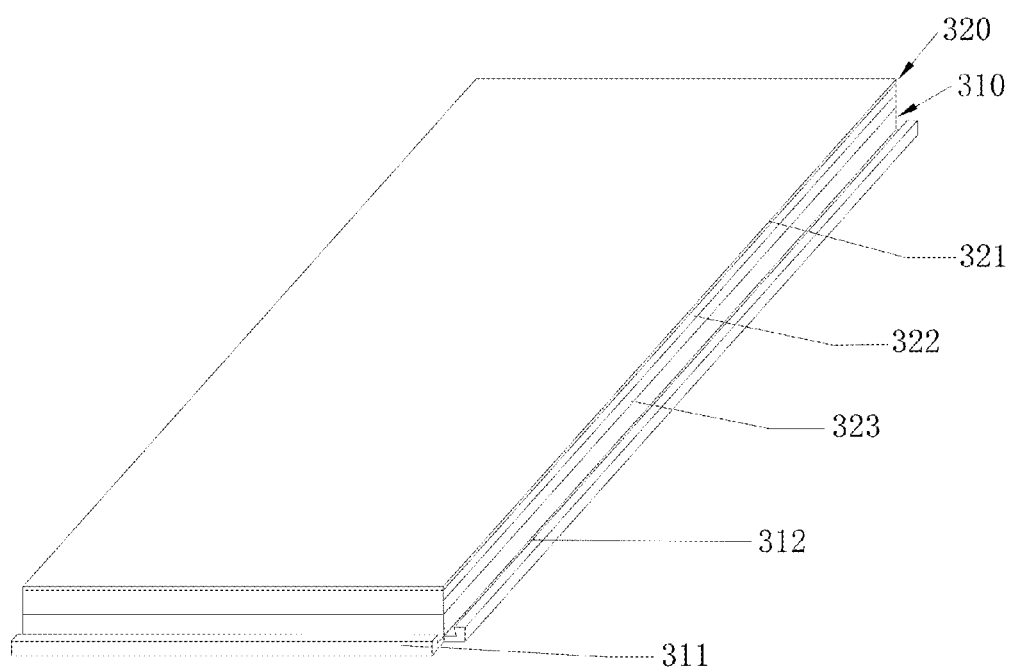
FIG. 3 is a structure diagram of flooring according to one embodiment of the present invention.

Referring to FIG. 3, a structure diagram of flooring according to one embodiment of the present invention is shown. The flooring includes a PVC foam layer (board) 310 as a substrate. The PVC foam layer 310 is 4-5 mm in thickness, and is provided with end buckles 311 and side buckles 312 (there many combination ways of the buckles, for example, making the front buckle of the flooring upward, the front buckle downward, the left buckle downward, and the right buckle downward), to be in seamless connection to adjacent floorings. The PVC foam layer 310 is formed by foaming the foregoing PVC composite material, and has a good mute effect, and good strength, hardness and toughness. The quality and service life of the product are improved greatly. To achieve waterproof, wear resistance and other performances, the PVC foam layer 310 is provided thereon with a PVC layer 320, which is formed by a PVC wear-resistance layer (film) 321, a PVC color film layer 322, and a PVC substrate layer 323 by hot pressing from top to bottom. The PVC color film layer 322 is about 0.1 mm in thickness, and is printed thereon with flooring patterns to improve the aesthetic sense of the flooring. The PVC wear-resistance layer 321 is about 0.3-0.5 mm in thickness and covers on the PVC color film layer 322 to prevent the PVC color film layer 322 from being scratched and also to achieve the waterproof effect. The PVC substrate layer 323 is about 1.2-2 mm in thickness, and is hot-pressed together with the PVC color film layer 322 and the PVC wear-resistance layer 321 and then bonded to the PVC foam layer 310. Calcium carbonate or other analogues may be added into the PVC substrate layer 323 to improve the strength and hardness and thus to improve the quality of the flooring. Due to the use of the forgoing PVC composite materials, the flooring may effectively improve properties of the product, which is advantageous to hold a large market share.

It is to be pointed out that, the PVC substrate layer 323 in the above embodiment may also be removed during manufacturing the flooring. In this case, the PVC color film layer 322 is bonded to the PVC foam layer 310. Generally, in the case of not using the PVC substrate layer 323, the thickness of the PVC foam layer 310 may be increased slightly. The adhesion and hot-pressing process between different layers of the flooring may refer to the prior art, and may not be repeated here.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A flooring, comprising:
   a polyvinyl chloride polymer layer; and
   a polyvinyl chloride polymer foam layer, the polyvinyl chloride polymer foam layer being made by foaming of a polyvinyl chloride polymer composite material,
   the polyvinyl chloride polymer layer being bonded on the surface of the polyvinyl chloride polymer foam layer,
   wherein the polyvinyl chloride polymer composite material comprises:
   40-60 parts by weight of polyvinyl chloride polymer;
   40-60 parts by weight of light calcium carbonate;
   0.8-1.2 parts by weight of composite foaming agent comprising an inorganic foaming agent and an organic foaming agent;
   3-5 parts by weight of foam regulator;
   2-4 parts by weight of toughener;
   0.8-1.2 parts by weight of lubricant; and
   1.5-2.5 parts by weight of stabilizer;
   wherein the ratio of the inorganic foaming agent to the organic foaming agent by weight in the composite foaming agent is ½-1, and
   wherein the polyvinyl chloride polymer foam layer is free of plant fibers.

2. The flooring according to claim 1, wherein the polyvinyl chloride polymer layer comprises a hot-pressed polyvinyl chloride polymer wear-resistance layer and a polyvinyl chloride polymer color film layer,
   wherein the polyvinyl chloride polymer color film layer is bonded to the polyvinyl chloride polymer foam layer, or
   wherein the polyvinyl chloride polymer color film layer is hot-pressed onto a polyvinyl chloride polymer substrate layer and the polyvinyl chloride polymer substrate layer is bonded to the polyvinyl chloride polymer foam layer.

3. The flooring according to claim 2,
   wherein the inorganic foaming agent is sodium bicarbonate,
   wherein the organic foaming agent is azodicarbonamide,
   wherein the foam regulator is an acrylate,
   wherein the toughener is chlorinated polyethylene or polyacrylates,
   wherein the lubricant comprises stearic acid and polyethylene wax, and
   wherein the stabilizer comprises calcium stearate and zinc stearate.

4. The flooring according to claim 1, wherein the polyvinyl chloride polymer composite material comprises:
   45-55 parts by weight of polyvinyl chloride polymer;
   45-55 parts by weight of light calcium carbonate;
   0.9-1.1 parts by weight of composite foaming agent comprising an inorganic foaming agent and an organic foaming agent;
   3.5-4.5 parts by weight of foam regulator;
   2.5-3.5 parts by weight of toughener;
   0.9-1.1 parts by weight of lubricant; and
   1.8-2.2 parts by weight of stabilizer.

5. The flooring according to claim 4,
   wherein the inorganic foaming agent is sodium bicarbonate,
   wherein the organic foaming agent is azodicarbonamide,
   wherein the foam regulator is an acrylate,
   wherein the toughener is chlorinated polyethylene or polyacrylates,
   wherein the lubricant comprises stearic acid and polyethylene wax, and
   wherein the stabilizer comprises calcium stearate and zinc stearate.

6. The flooring according to claim 1, wherein the polyvinyl chloride polymer composite material comprises:
   50-60 parts by weight of polyvinyl chloride polymer;
   40-50 parts by weight of light calcium carbonate;
   1-1.2 parts by weight of composite foaming agent comprising an inorganic foaming agent and an organic foaming agent;
   4-5 parts by weight of foam regulator;
   3-4 parts by weight of toughener;
   1-1.2 parts by weight of lubricant; and
   2-2.5 parts by weight of stabilizer.

7. The flooring according to claim 6,
   wherein the inorganic foaming agent is sodium bicarbonate,
   wherein the organic foaming agent is azodicarbonamide,
   wherein the foam regulator is an acrylate,
   wherein the toughener is chlorinated polyethylene or polyacrylates,
   wherein the lubricant comprises stearic acid and polyethylene wax, and
   wherein the stabilizer comprises calcium stearate and zinc stearate.

8. The flooring according to claim 1, wherein the polyvinyl chloride polymer composite material comprises: a brightening agent, an amount of the brightening agent being less than 1.5 parts by weight.

9. The flooring according to claim 8,
   wherein the inorganic foaming agent is sodium bicarbonate,
   wherein the organic foaming agent is azodicarbonamide,
   wherein the foam regulator is an acrylate,
   wherein the toughener is chlorinated polyethylene or polyacrylates,
   wherein the lubricant comprises stearic acid and polyethylene wax,
   wherein the stabilizer comprises calcium stearate and zinc stearate, and
   wherein the brightening agent is titanium oxide.

* * * * *